United States Patent
Jang et al.

(10) Patent No.: US 8,165,284 B2
(45) Date of Patent: Apr. 24, 2012

(54) SLIDE MODULE AND PORTABLE TERMINAL HAVING THE SAME

(75) Inventors: Chang Yong Jang, Gyeongsangnam-Do (KR); Min-Soo Kim, Gyeonggi-Do (KR); Won-Seok Joo, Seoul (KR); Ki-Hoon Song, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1161 days.

(21) Appl. No.: 11/923,372

(22) Filed: Oct. 24, 2007

(65) Prior Publication Data

US 2008/0098847 A1    May 1, 2008

(30) Foreign Application Priority Data

Oct. 26, 2006   (KR) ................. 10-2006-0104662

(51) Int. Cl.
*H04M 9/00* (2006.01)
*H04M 1/00* (2006.01)

(52) U.S. Cl. ............... 379/433.12; 455/575.4

(58) Field of Classification Search ........... 200/550; 379/428.01, 433.11, 433.12, 433.01; 455/550.1, 455/575.1, 575.4
See application file for complete search history.

(56) References Cited

U.S. PATENT DOCUMENTS

| 7,783,331 B2 * | 8/2010 | Chung et al. .......... 455/575.1 |
| 2006/0180457 A1 | 8/2006 | Han et al. |
| 2008/0073196 A1 * | 3/2008 | Chung .................. 200/550 |

FOREIGN PATENT DOCUMENTS

| CN | 101155487 A | 4/2008 |
| KR | 10-2003-0016841 A | 3/2003 |
| KR | 20-0397454 Y1 | 9/2005 |
| WO | WO 2005/020452 A1 | 3/2005 |
| WO | WO 2006/006776 A1 | 1/2006 |

OTHER PUBLICATIONS

KR 20-0397454 (English Translation).*

* cited by examiner

*Primary Examiner* — Davetta W Goins
*Assistant Examiner* — Phylesha Dabney
(74) *Attorney, Agent, or Firm* — Birch, Stewart, Kolasch & Birch, LLP

(57) ABSTRACT

A slide module having a first slide member, a second slide member moveable with respect to the first slide member, and a biasing unit connecting the first slide member to the second slide member, is provided. The biasing unit includes a first linkage having a plurality of links, the first linkage having one end rotatably connected to the first slide member and the other end rotatably connected to the second slide member, a second linkage having a plurality of links, the second linkage having one end of the second linkage rotatably connected to the first slide member and the other end rotatably connected to the second slide member, and a biasing mechanism connected between the first linkage and the second linkage.

27 Claims, 10 Drawing Sheets

SLIDE MODULE AND PORTABLE TERMINAL HAVING THE SAME

CROSS REFERENCE TO RELATED APPLICATIONS

This application claims priority to Korean Application No. 10-2006-0104662, filed on Oct. 26, 2006, which is herein expressly incorporated by reference in its entirety.

BACKGROUND OF THE INVENTION

1. Field of the Invention

The present invention generally relates to a slide module and a portable terminal having the same, and more particularly, to a slide module having a biasing unit which is capable of providing a biasing force assisting in sliding a first body upwardly/downwardly when the first body is relatively slid upwardly/downwardly with respect to a second body, and a portable terminal having the same.

2. Description of Related Art

The slide module in accordance with the related art, as seen in FIG. 1, includes a first slide member 300 fixed at a first body (not shown), a second slide member 310 fixed at a second body (not shown) and slidably mounted on the first slide member 300, and an elastic force providing unit 320 installed between the first slide member 300 and the second slide member 310 for providing an elastic force when the first slide member 300 is slid so as to assist in the opening/closing of the first body.

The elastic force providing unit 320 includes a first member 330 connected to the first slide member 300 by a hinge, a second member 340 connected with the first member 330 so as to be reciprocally linear-movable with respect thereto. The second member 340 is connected to the second slide member 310 by a hinge. Coil springs 350 are connected between the first rod 330 and the second rod 340 for providing the elastic force.

When the first slide member 300 is slid between a first position and a second position, the first rod 330 and the second rod 340 are slid in an opposite direction to each other thereby adding tension to the coil springs 350. Once the first slide member passes through a dead point (i.e., point of greatest tension), the tension in the coil springs 350 is released, thereby the elastic force providing unit provides the elastic force which assists in moving the first slide member 300 beyond the dead point.

However, because the elastic force providing unit in accordance with the related art has a structure in which the first member and the second member slide across each other, large frictional forces and noise is generated. As the generated friction and noise becomes severe, the reliability of the slide module is degraded.

In addition, because the elastic force providing unit in accordance with the related art has a complex structure, fabrication costs are relatively large.

BRIEF SUMMARY OF THE INVENTION

In order to overcome these drawbacks, one exemplary feature of the present disclosure is to provide a slide module having a biasing unit which is capable of attenuating noise and enhancing reliability by minimizing interference between slide members and the biasing unit, and reducing fabrication costs by simplifying the structure.

According to principles of this invention, a slide module having a first slide member, a second slide member moveable with respect to the first slide member, and a biasing unit connecting the first slide member to the second slide member, is provided. The biasing unit includes a first linkage having a plurality of links, the first linkage having one end rotatably connected to the first slide member and the other end rotatably connected to the second slide member, a second linkage having a plurality of links, the second linkage having one end of the second linkage rotatably connected to the first slide member and the other end rotatably connected to the second slide member, and a biasing mechanism connected between the first linkage and the second linkage.

According to another aspect, the first linkage may include a first link rotatably connected to the first slide member and a second link rotatably connected to the second slide member, the first link is connected to the second link, and the first and second links have curved portions that extend at a predetermined angle.

According to another aspect, the second linkage may include a third link arranged to face the first link and a fourth link arranged to face the second link.

According to still another aspect, overlapping connection portions may be provided at each end of each link to provide the rotatable connection, each connection portion may be thinner than a middle portion of each link, and a connection pin may be inserted into each overlapping connection portion.

According to yet another aspect, a stopper portion may be provided at the end of the first linkage rotatably connected at the first slide member and at the end of the second linkage rotatably connected to the second slide member, each stopper portions may be formed at a lateral surface of each of the overlapping connection portions corresponding to the end of the first linkage rotatably connected at the first slide member and the end of the second linkage rotatably connected to the second slide member.

According to another aspect, the biasing mechanism may include at least a first elastic member connected between the first link and the third link, and at least a second elastic member connected between the second link and the fourth link.

According to a further aspect, the first elastic member and the second elastic member may be coil springs, and an elastic member mounting portion may be formed to connect the coil springs at the lateral surface of each link. Each elastic member mounting portion may include an insertion groove provided in the link in a width direction to receive an end portion of the coil spring inserted therein, and a stopping protrusion inwardly protruded at a central portion of the insertion groove, the diameter of the insertion groove at the stopping protrusion is smaller than the diameter of the end portion of the coil spring inserted therein.

According to a different aspect, each end of each coil spring may include a connection ring, and each elastic member mounting portion may include a connection pin protruded at the lateral surface of the link in a thickness direction of the link to receive one of the connection rings.

According to another aspect, the biasing unit may include a first connection member arm connecting the first link and the third link to the first slide member, and a second connection member arm connecting the second link and the fourth link to the second slide member.

According to still another aspect, the first linkage may include a first link, a second link having one end rotatably connected to the first slide member and the other end rotatably connected to the first link, and a third link having one end rotatably connected to the second slide member and the other end rotatably connected to the first link.

According to a further aspect, the second linkage may include a fourth link arranged to face the first link, a fifth link having one end rotatably connected to the first slide member and the other end rotatably connected to the fourth link, and a sixth link having one end rotatably connected to the second slide member and the other end rotatably connected to the fourth link. The biasing mechanism may be connected between the first link and the fourth link. The biasing mechanism may include a plurality of coil springs.

According to still a further aspect, a leveling member may be located between the first link and the fourth link so as to maintain the first link and the fourth link parallel to each other. The first link may include a guide groove in a width direction of the first link, the fourth link may include a guide groove in a width direction of the fourth link, and one end of the leveling member may be slidably inserted into the guide groove of the first link and the other end of the leveling member may be slidably inserted into the guide groove of the fourth link.

According to principles of the present invention, a portable terminal having a first body, a second body slidably connected to the first body, and a slide module located between the first body and the second body, is provided. The slide module includes a first slide member connected to one of the first body and the second body, a second slide member connected to the other of the first body and the second body, the second slide member being moveable with respect to the first slide member, and a biasing unit connecting the first slide member to the second slide member. The biasing member includes a first linkage having a plurality of links, the first linkage having one end rotatably connected to the first slide member and the other end rotatably connected to the second slide member, a second linkage having a plurality of links, the second linkage having one end of the second linkage rotatably connected to the first slide member and the other end rotatably connected to the second slide member, and a biasing mechanism connected between the first linkage and the second linkage.

Additional aspects of the portable terminal are similar to those described above with respect to the slide module.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiment of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings.

Figure 1:
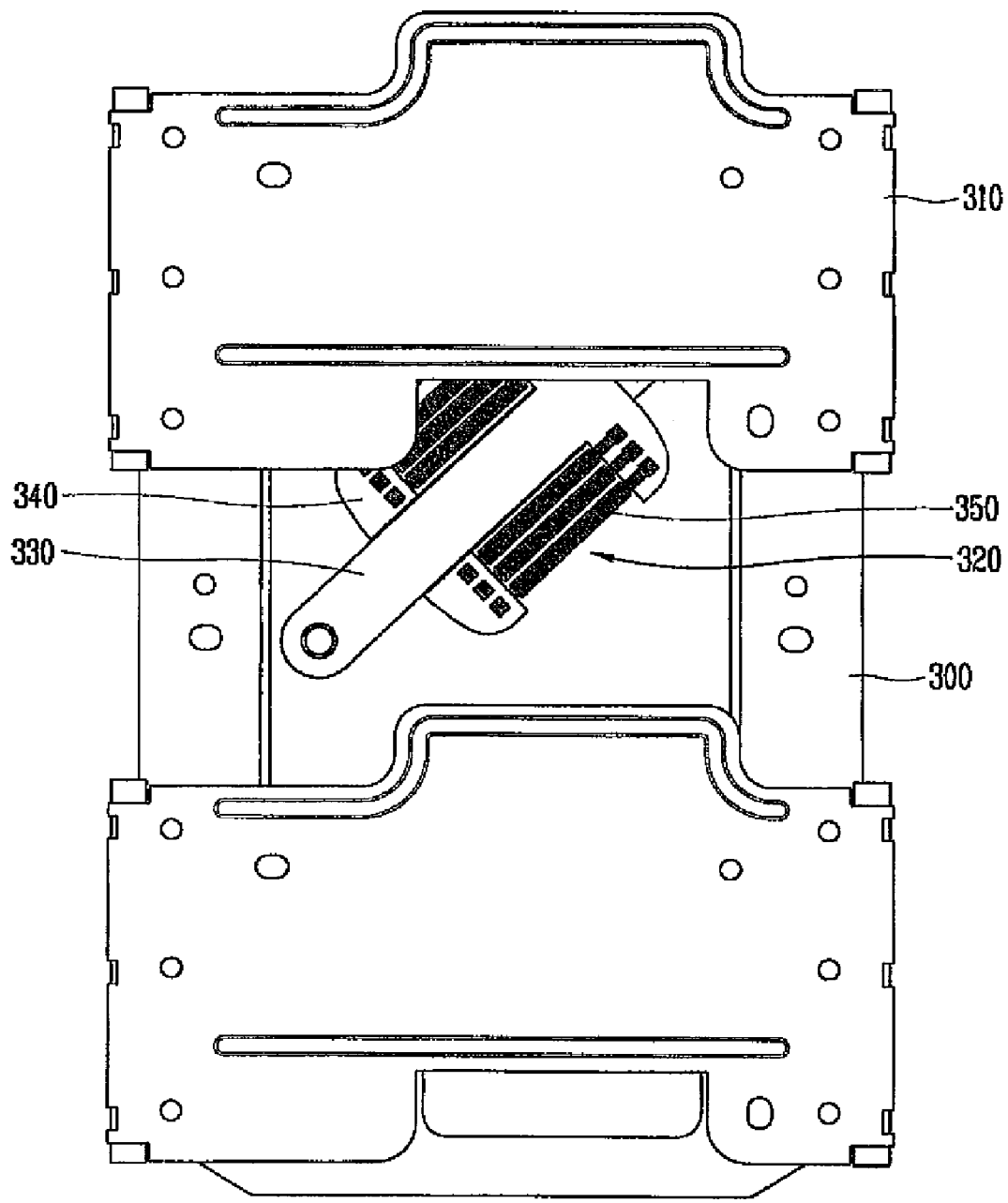
FIG. 1 is a plan view of a slide module in accordance with the related art.
Figure 2:
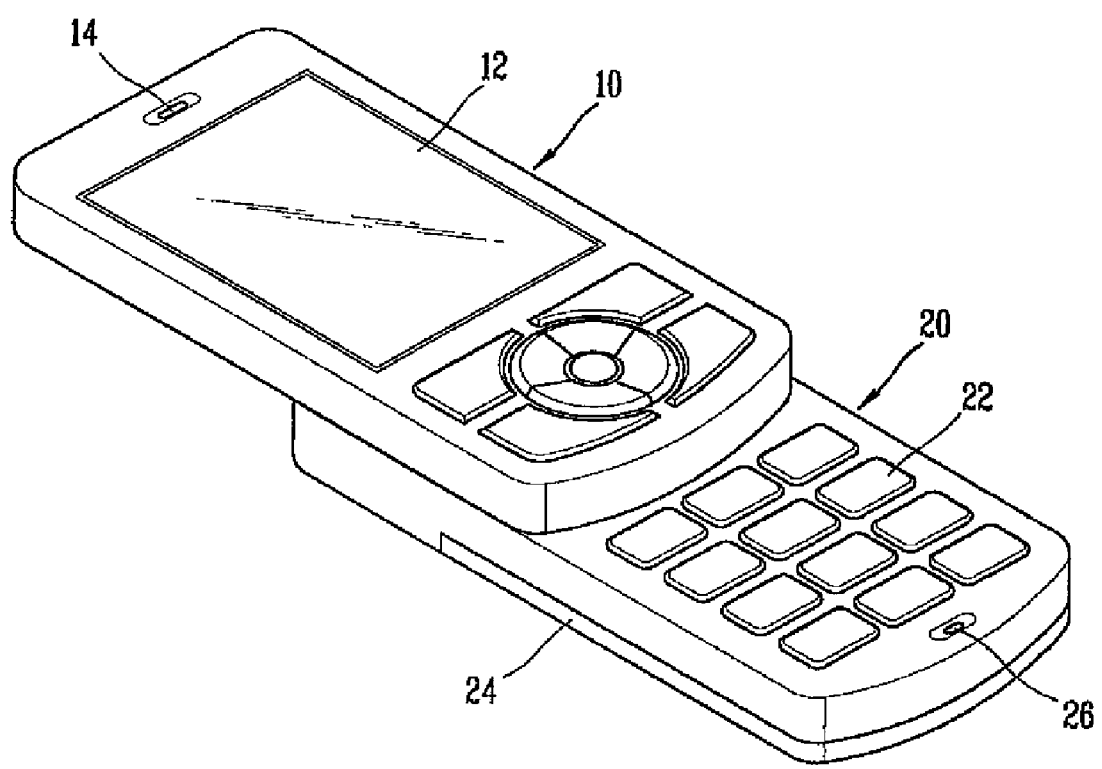
FIG. 2 is a perspective view of a portable terminal in accordance with the present invention.
Figure 3:
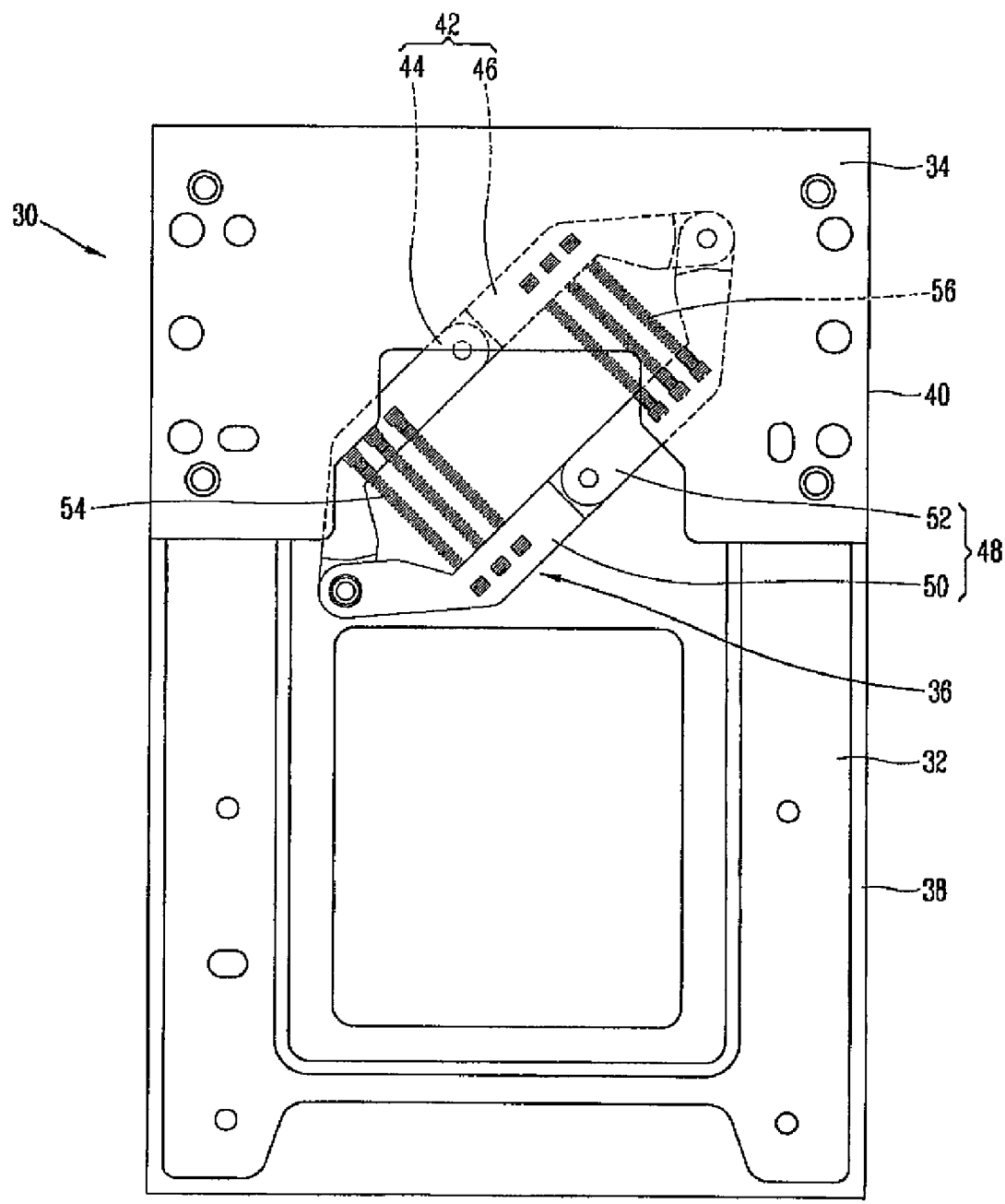
FIG. 3 is a plan view of a slide module in accordance with the present invention.
Figure 4:
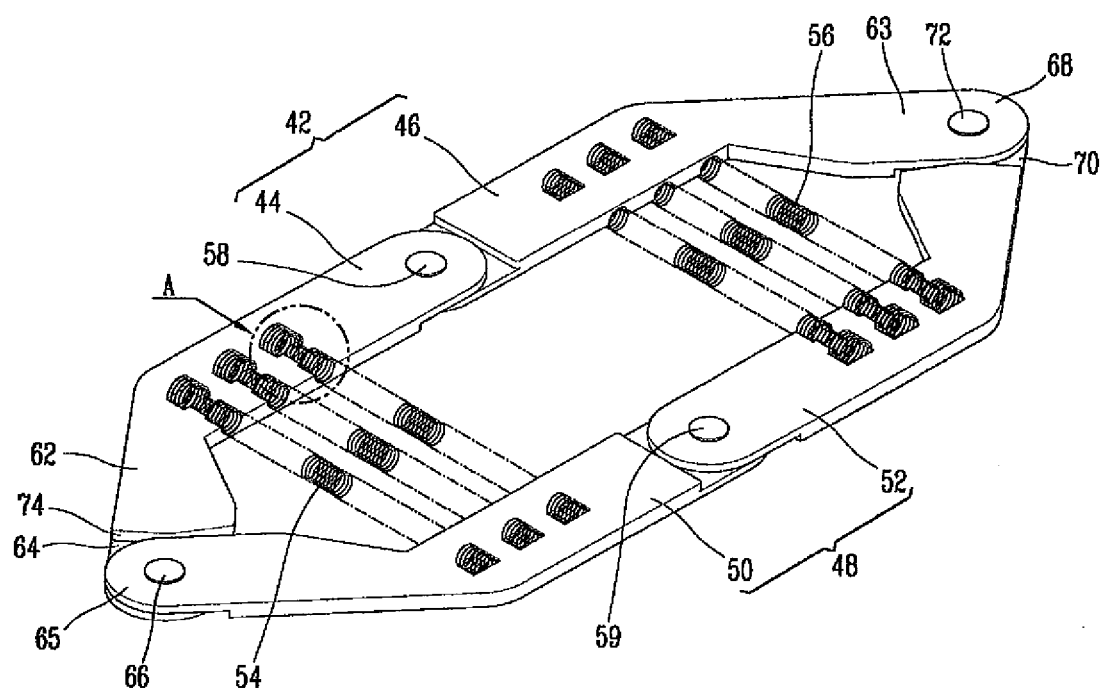
FIG. 4 is a perspective view of a biasing unit in accordance with a first embodiment of the present invention.

As seen in FIGS. 2-4, a portable terminal in accordance with an exemplary embodiment of the present invention may include a first body 10 provided with a display 12 for viewing/inputting information, and a second body 20 slidably connected to the first body 10. The second body 20 may include an input device 22 for inputting information and a battery 24 for supplying power mounted at a rear portion of the second body 20. A speaker 14 may be located at the first body 10 for outputting sound and a microphone 26 may be located at the second body for inputting sound.

The portable terminal also includes a slide module 30 connecting the first body 10 to the second body 20 to assist is sliding the first body 10 with respect to the second body 20. The slide module 30 may include a first slide member 32 fixed at a lower surface of the first body 10, a second slide member 34 slidably connected to the first slide member 32 and fixed at the second body 20, and a biasing unit 36 connecting the first slide member 32 to the second slide member 34. The biasing unit 36 provides a biasing force to assist in the sliding movement of the first body 10 with respect to the second body 20. For example, the biasing unit 36 may provide an elastic force so as to assist in moving the slide members when the first body 10 is slid in an opened or closed direction.

The first slide member 32, which may be plate-shaped, may be coupled to the lower surface of the first body 10 by one or more bolts or other fasteners. The first slide member 32 may include a guide rail 38 be located at both edges thereof. The second slide member 34, which may also be plate-shaped, may be coupled to an upper surface of the second body 20 by one or more bolts or other fasteners. The second slide member 34 may include a guide groove 40 located at both edges of the second slide member 34. The guide grooves 40 are inserted into guide rails 38 and are capable of sliding along the guide rails. It is understood that the first slide member may be provided with the guide grooves and the second slide member may be provided with the guide rails.

The biasing unit 30 may include a first linkage 42 having one end rotatably connected to the first slide member 32 and having the other end rotatably connected to the second slide member 34. The first linkage 42 may include a plurality of links 44 and 46 connected to each other by a connection pin 58. The biasing unit 30 may include a second linkage 48 disposed to be faced with the first linkage 42. The second linkage 48 has one end rotatably connected to the first slide member 32 and has the other end rotatably connected to the second slide member 34. The second linkage 48 may include a plurality of links 50 and 52 connected to each other by connecting pin 59. A biasing mechanism, which may include a first and second elastic members 54 and 56, is connected between the first linkage 42 and the second linkage 48 to provide a biasing force, such as an elastic force, to draw the first linkage 42 and second linkage 48 towards each other.

As described above, the first linkage 42 may include a first link 44 having one end rotatably connected to one side of the first slide member 32, and a second link 46 having one end rotatably connected to the other end of the first link 44 by a connection pin 58 and having the other end rotatably connected to one side of the second slide member 34.

An end portion or connection portion of each end of the first link 44 and the second link 46 may be formed to be thinner than other portions of the links and be disposed to be overlapped and connected to each other by the connection pin 58 so that the first link 44 and second link 46 are rotatably connected to each other.

Further, curved portions extending at a predetermined angle may be formed at each end of the first link 44 and the second link 46 opposite the ends connected by connection pin 58. A connection portion 64 connected to the first slide member 32 by a connection pin 66 may be formed at an end portion of the curved portion 62 of the first link, and a connection portion 68 connected to the second slide member 32 by a connection pin 72 may be formed at an end portion of the curved portion 63 of the second link.

The second linkage 48 includes a third link 50 formed in the same shape as the first link 44 and disposed to be faced with the first link 44, and a fourth link 52 formed in the same shape as the second link 46 and disposed to face the second link 46. The fourth link 52 is connected to the third link 50 by the connection pin 59.

Herein, the connection portion 64 of the first link 44 may be connected to the first slide member 32 by the connection pin 66 while being overlapped with a connection portion 65 of the third link 50. Also, the connection portion 68 of the second link 44 may be connected to the second slide member 34 by the connection pin 72 while being overlapped with the connection portion 70 of the fourth link 52. Each connection portion may be formed to be thinner than other portions of the links, which assist in limiting the thickness of the biasing unit when the connection portions are overlapped.

As described above, each link is curved to extend at a predetermined angle, so that, when the first linkage 42 and the second linkage 48 are connected to each other, the entire shape may be a hexagonal shape.

As seen in FIG. 4, stopper portions 74 may be formed at the connection portions 64 and 65 of the first and third links 44 and 50, respectively, and at the connection portions 68 and 70 of the second and fourth links 46 and 52, respectively. The stopper portions 74 are provided to prevent each link to be rotated beyond a predetermined range. Each stopper portion 74 may be a lateral surface located at each of the connection portions, which prevents each link from being rotated beyond the predetermined range as the lateral surfaces are brought into contact with each other.

The biasing mechanism may include the first elastic member 54 connected between the first link 44 and the third link 50, and the second elastic member 56 connected between the second link 46 and the fourth link 52. As seen in FIGS. 3 and 4, the first elastic member 54 and the second elastic member 56 may include one or more coil springs. An elastic member mounting portion 80 may be formed at the lateral surface of each link for mounting the elastic members 54 and 56.

Figure 5:
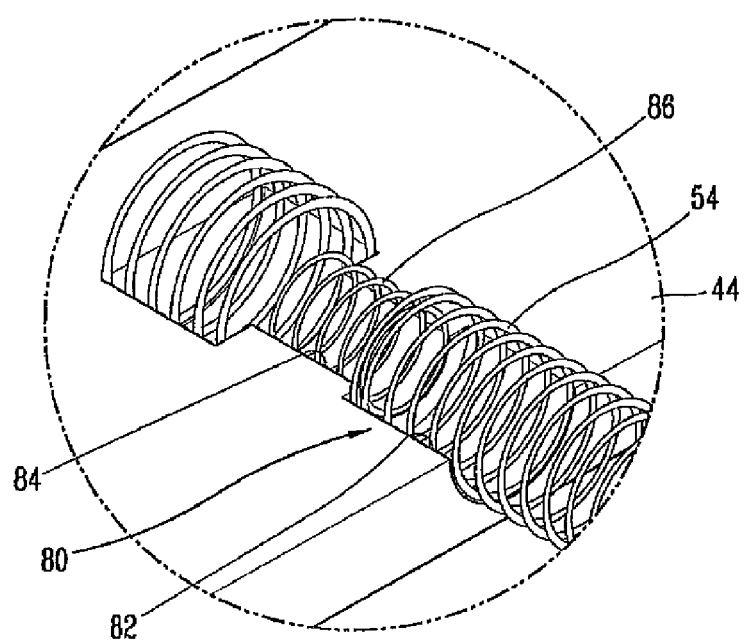
FIG. 5 is a magnified partial view showing detail A in FIG. 4.

An exemplary embodiment of the elastic member mounting portion 80, as seen in FIG. 5, may include an insertion groove 82 formed at the link 44 in a width direction for an end portion of the elastic member 54 to be inserted thereinto, and a stopping protrusion 84 inwardly protruded at the central portion of the insertion groove 82. The stopping protrusion 84 provides for a diameter reduction portion 86 which has a diameter narrower than that of the coil spring 54 inserted therein. That is, in the elastic member mounting portion 80, if both ends of the elastic member 54 are inserted into the insertion groove 82, respectively, the diameter reduction portion 86 formed at both ends of the spring 54 may be inserted into the stopping protrusion 84 for fixing both ends of the spring 54 at each link 44.

Figure 6:
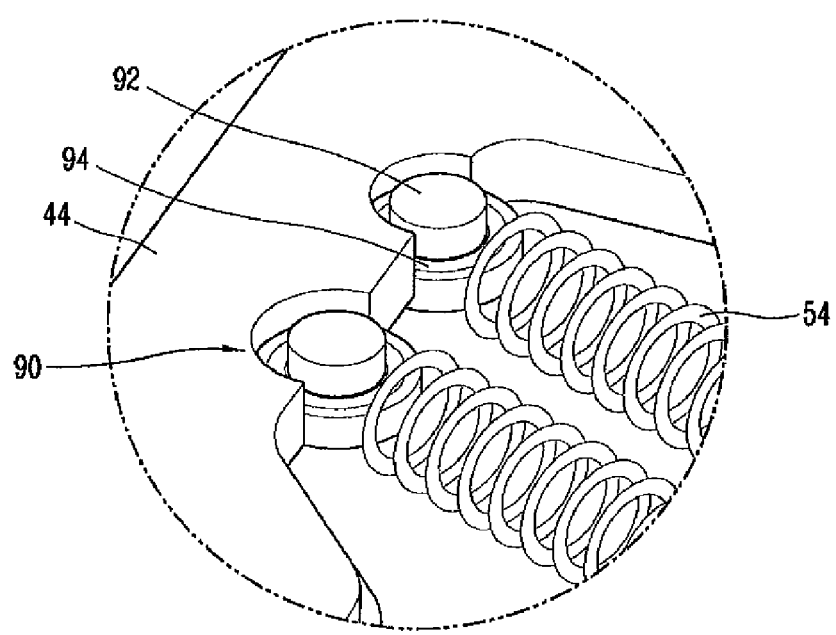
FIG. 6 is a partial perspective view showing an elastic member mounting portion in accordance with the present invention.

According to another exemplary embodiment of the present invention, an elastic member mounting portion 90, as seen in FIG. 6, may include connection pins 92 protruded at a lateral surface of the link 44 in a thickness direction of the link 44. The connection pins 92 may have a cylindrical shape for receiving connection rings 94 provided at both ends of the coil spring 54.

In the elastic member mounting portion 90 in accordance with another embodiment, the connection rings 94 formed at the end portion of the coil spring 54 may encircle the connection pins 92. As a result, the connection rings 94 may rotate on an outer circumferential surface of the connection pins 92 when the link 44 is rotated, thereby making it is possible to prevent the coil spring 54 from being interfered with during rotation of the link 44.

With such structure thereabove, an operation of the slide module in accordance with one embodiment of the present invention will be described as follows.

First, as shown in FIG. 3, when the second slide member 34 is located at an upper side of the first slide member 32, the first body 10 may be closed with respect to the second body 20. At this time, the biasing unit 36 may be disposed to be inclined with one end connected to a position at an edge of one side of the first slide member 32 by the connection pin 66 and the other end connected to an edge of the other side of the second slide member 34 by the connection pin 72.

As described thereabove, when the first body 10 is closed with respect to the second body 20, the first and second links 44 and 46 may be disposed to be substantially parallel with the third and fourth links 50 and 52, and, at this time, the elastic members 54 and 56 may be the most compressed.

Figure 7:
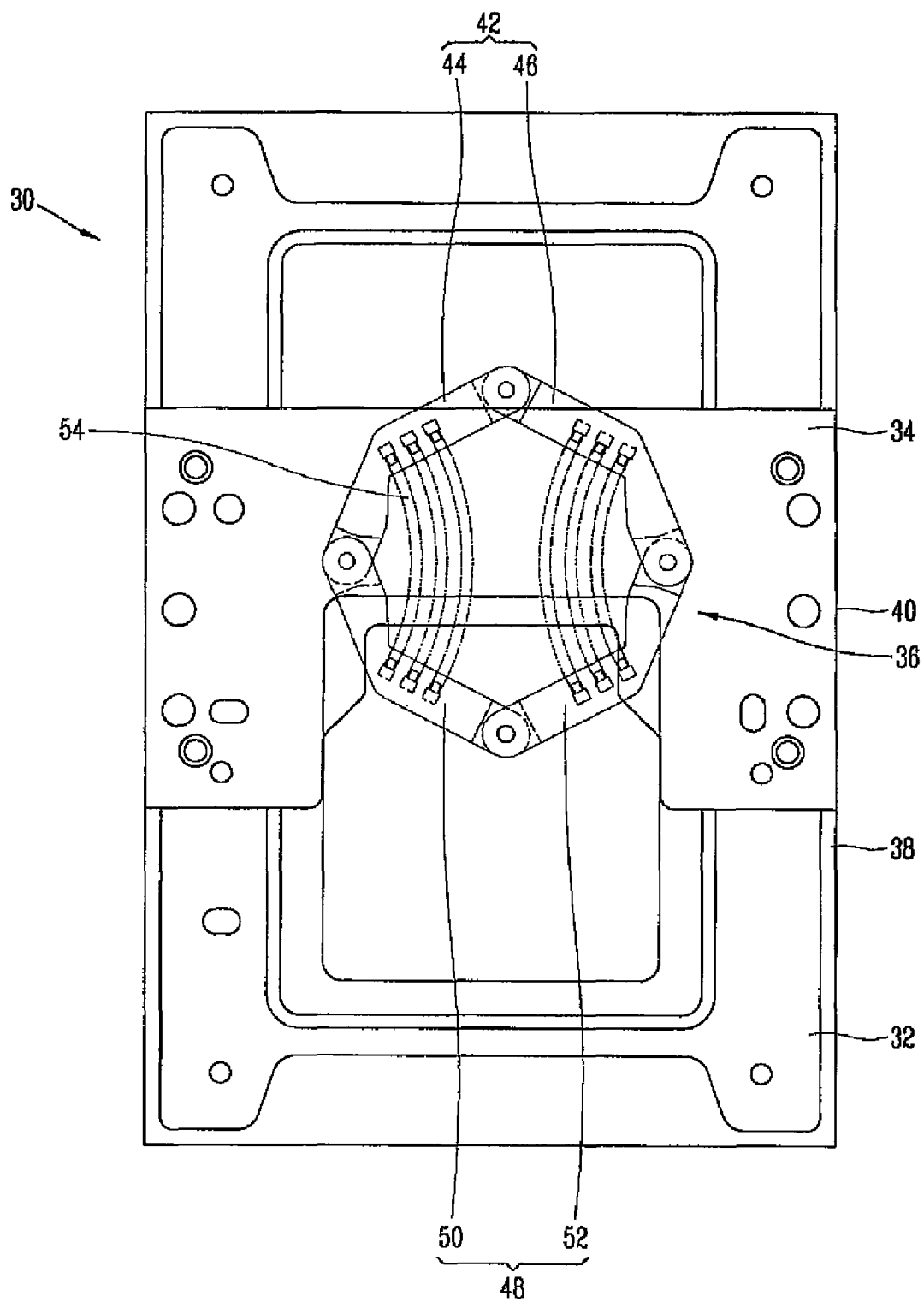
FIGS. 7 and 8 show an operation of the biasing unit in accordance with the first embodiment of the present invention.

When the first body 10 is slid in an opened direction, the first slide member 32 may be respectively slid with respect to the second side member 32. Then, each link 44, 46, 50 and 52 of the biasing unit 36 may be rotated with respect to each other, as shown in FIG. 7, to a location where the distance between the first and second links 44 and 46 and the third and fourth links 50 and 52 is the largest, and, at this time, the elastic members 54 and 56 also may be under the most amount of tension. At this time, the biasing unit 36 may have an almost octagonal shape depending on the curved portions of the links.

In this state, the first slide member 32 passes through a dead point, afterwhich the elastic force of the elastic members 54 and 56 may operate on each link to pull the links back towards each other. Then the distance between each link may become narrow, whereby the first slide member 32 is assisted by the biasing unit to slide in the opened direction.

Figure 8:
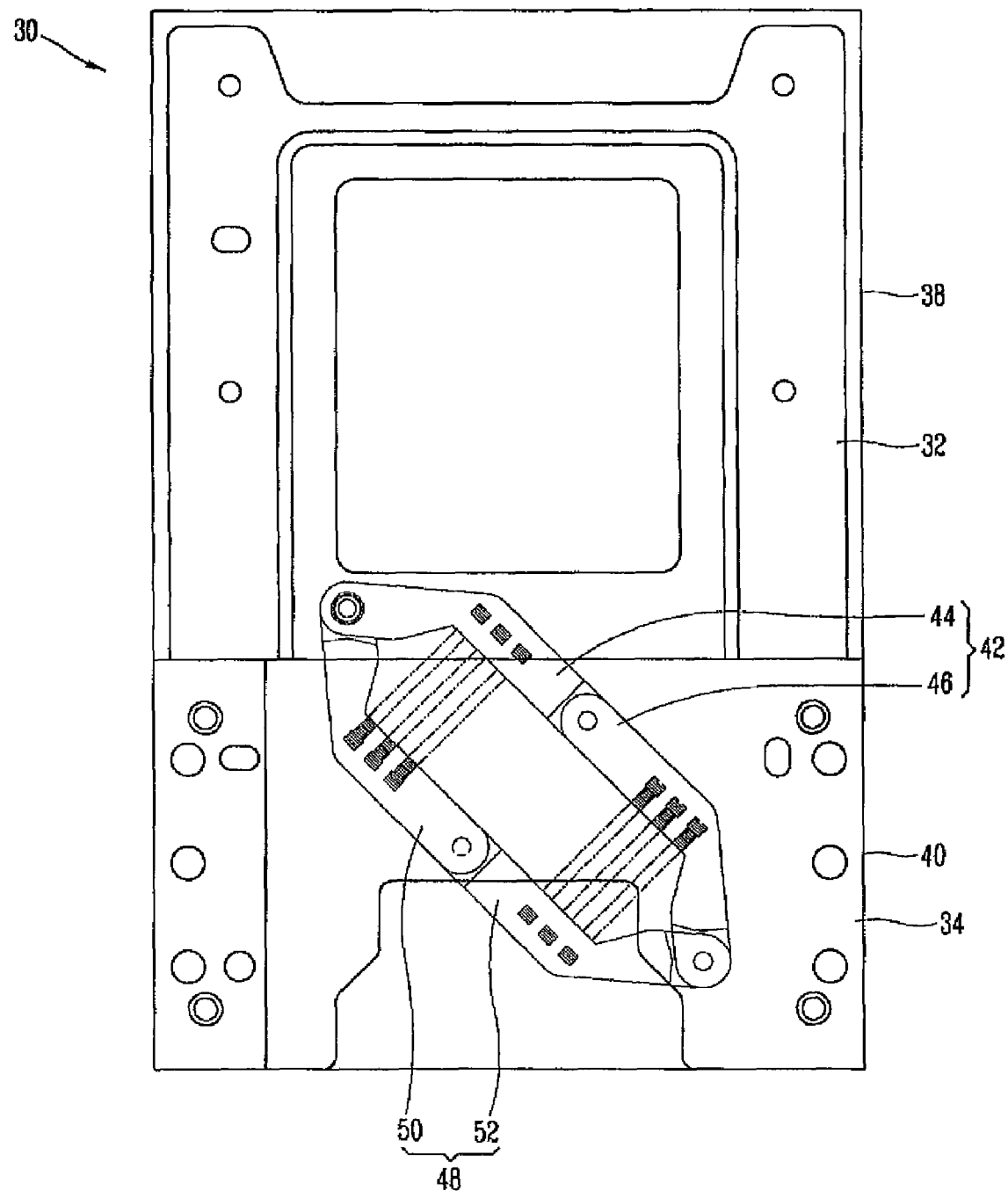

When the first body 10 is completely opened, as seen in FIG. 8, the biasing unit 36 may be inclined again, so the first body 10 may be maintained in the opened state by the elastic force of the elastic members 54 and 56. The above process works in reverse when the first body 10 is slid into the closed position.

Figure 9:
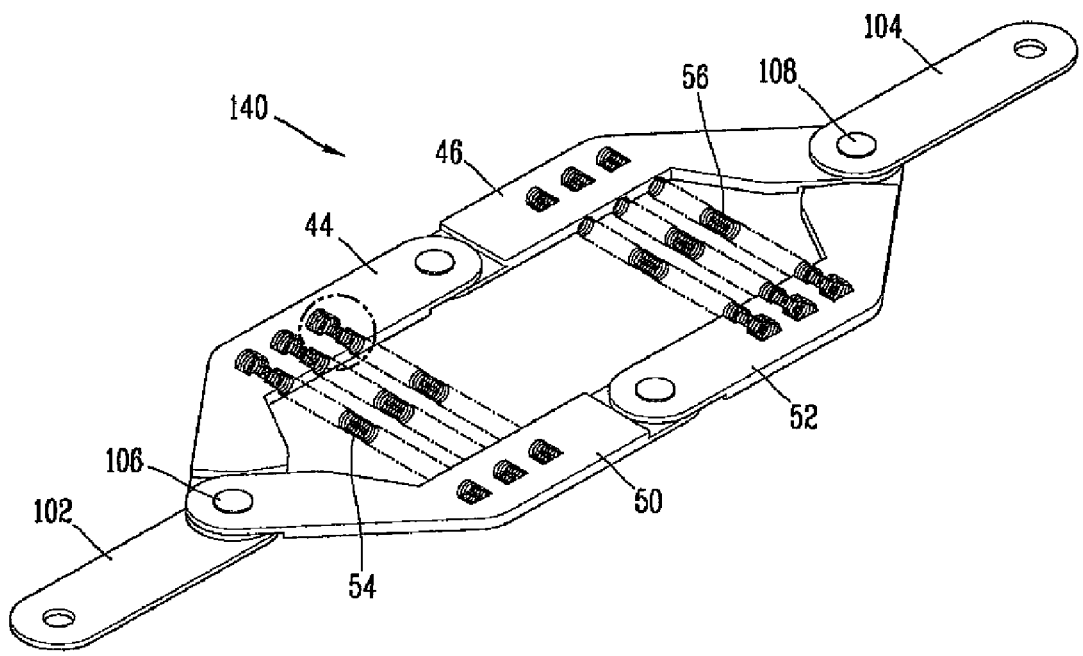
FIG. 9 is a plan view of an biasing unit in accordance with a second embodiment of the present invention.

A biasing unit 100 in accordance with a second exemplary embodiment, as seen in FIG. 9, has the same configuration as that of the biasing unit described in the first embodiment except that first and second connection arms 102 and 104 are provided. The first connection arm 102 may be connected to the first slide member 32 by the connection pin 66, and the first link 44 and the third link 50 may be connected to an end portion of the first connection arm 102 by a connection pin 106. The second connection arm 104 may be connected to the second slide member 34 by the connection pin 72, and the second link 46 and the fourth link 52 may be connected to the end portion of the second connection arm 104 by a connection pin 108.

As described thereabove, the biasing unit in accordance with the second embodiment may be configured such that a connection portion of the first link 44 and the third link 50 may be connected to the first connection arm 102 by the connection pin 106 while being overlapped to each other, and the second link 46 and the fourth link 52 may be connected to the second connection arm 104 by the connection pin 108 is capable of being fabricated in one assembly shape.

Therefore, after the biasing unit 100 is fabricated into one assembly, the first connection arm 102 may be connected to the first slide member 32 by the connection pin 66 and the second connection arm 104 may be connected to the second slide member 34 by the connection pin 72, thereby providing a simple assembly process.

Figure 10:
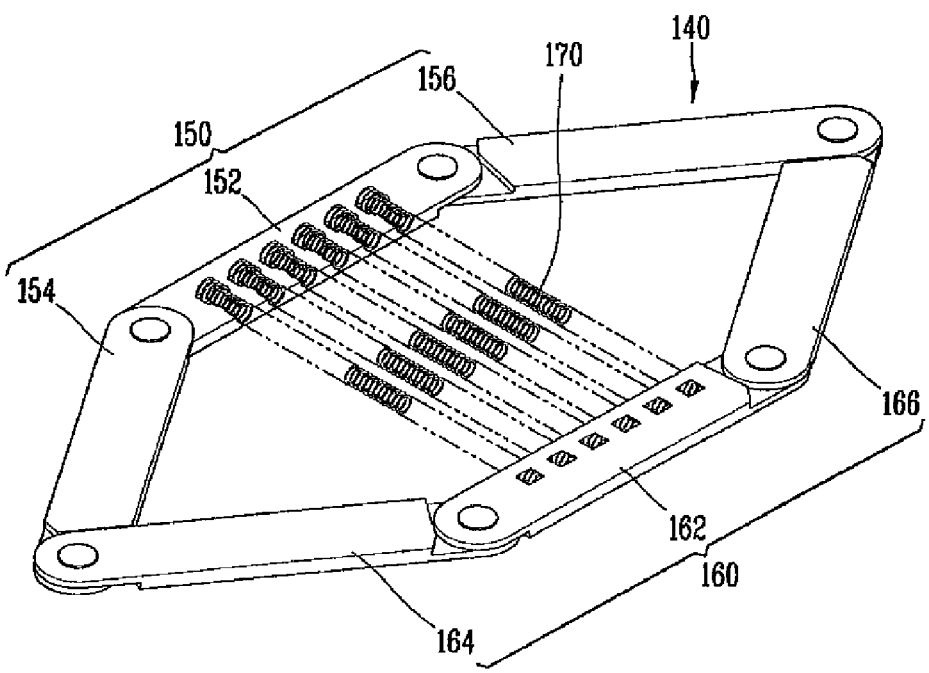
FIG. 10 is a plan view of an biasing unit in accordance with a third embodiment of the present invention.
Figure 11:
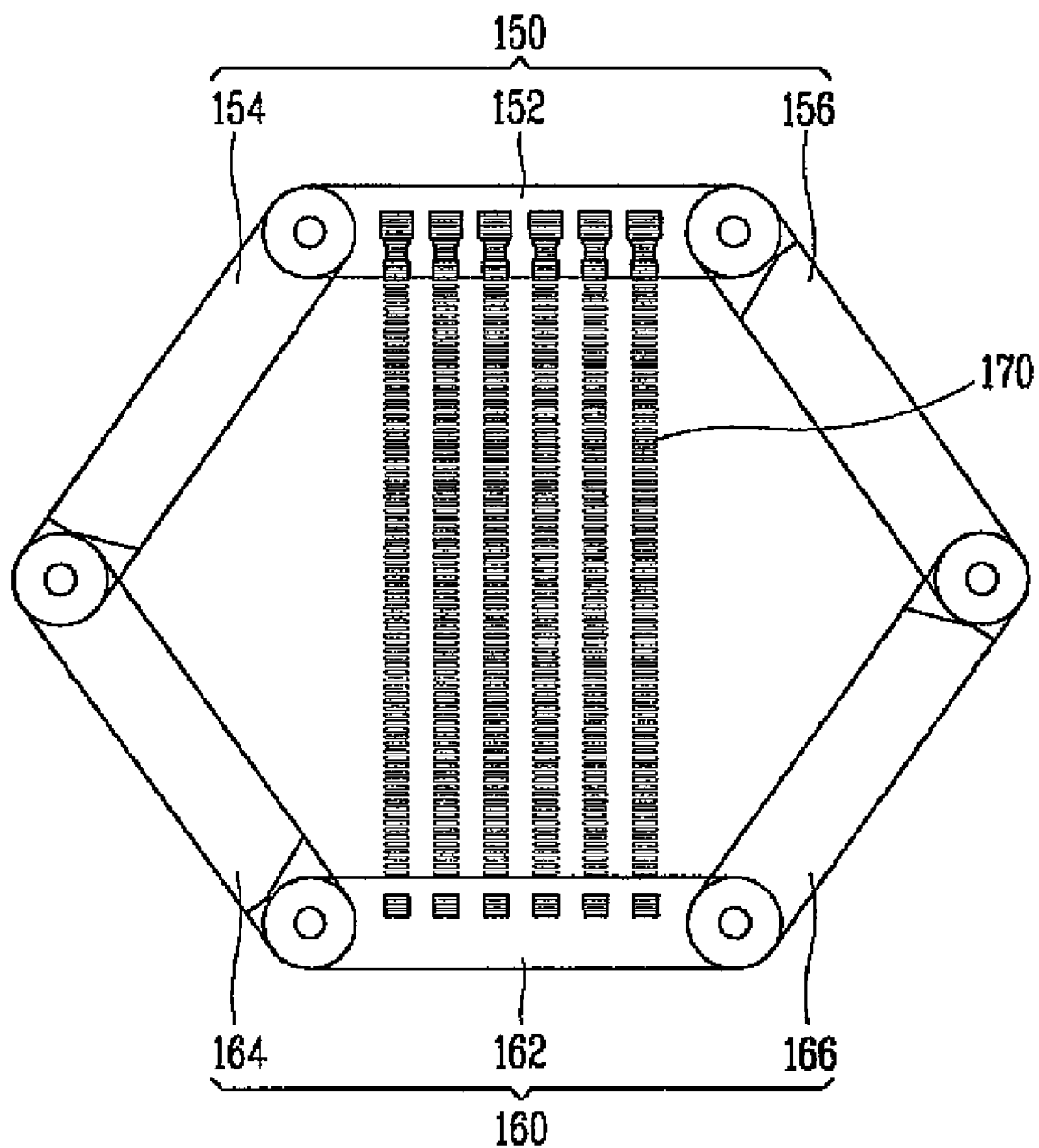
FIG. 11 shows an operation of the biasing unit in accordance with the third embodiment of the present invention.

As seen in FIGS. 10 and 11, a biasing unit 140 in accordance with a third exemplary embodiment may include a first linkage 150 having a plurality of links 152, 154, and 156 that are connected by connection pins, where one end of the linkage 150 is connected to the first slide member 32 by a connection pin and the other end of the linkage 150 is connected to the second slide member 34 by a connection pin. The biasing unit 140 may include a second linkage 160 arranged to face the first linkage 150. The second linkage may include a plurality of links 162, 164, and 166 that are connected by connection pins. The biasing unit 140 also includes a biasing mechanism that includes at least one elastic member 170 connected between the first linkage 150 and the second linkage 160 to provide an elastic force.

The first linkage 150 may include a first link 152 which may be horizontally arranged with respect to the first body 10, a second link 154 connected to one end of the first link 152 and the first slide member 32 by connecting pins, and a third link 156 connected to the other end of the first link 152 and the second slide member 34 by connecting pins.

The second linkage 160 may include a fourth link 162 that may be horizontally arranged to face the first link 152, a fifth link 164 connected to one end of the fourth link 162 by a connection pin and connected to the first slide member 32 by a connection pin similar to the second link 154, and a sixth link 166 connected to the other end of the fourth link 162 by a connecting pin and connected to the second slide member 34 by a connection pin similar to the third link 156.

Because the first to sixth links are connected to each other by connection pins, and the first and fourth links may be horizontally arranged, the entire shape may be a hexagonal shape.

The elastic member 170 may be provided with one end connected to the first link 152 and the other end connected to the fourth link 162 to provide an elastic force in the direction that a distance between the first link 152 and the fourth link 162 becomes wider. As seen in FIGS. 10 and 11, the elastic member 170 may include one or more coil springs, wherein the number of the coil springs can be adjusted depending on the elastic force desired. The connection portions formed at the end portions of each link may be the same as that described above.

Hereinafter, an operation of the biasing unit 140 of the slide module in accordance with the third embodiment of the present invention will be described.

If the second slide member 34 is slid with respect to the first slide member 32, a gap between the first linkage 150 and the second linkage 160 may increase. Specifically the distance between the first link 152 and the fourth link 162 may become wider, and thus the tension in elastic member 170 connected between the first link 152 and the fourth link 162 may also increase. At this time, the first link 152 and the fourth link 162 may be maintained in the horizontal state with respect to each other. Thereby the elastic member 170 can be tensioned and contracted in a straight line direction.

When the second slide member 34 is located at a middle portion, the biasing unit 140 may have the shape shown in FIG. 11 when the biasing unit 140 reaches the dead point. If the second slide member 34 is slid through the dead point, the gap between the first linkage 150 and the second linkage 160 may then narrow due to the elastic force of the elastic member 170, thereby assisting the second slide member 34 to move in the direction that the second slide member 34 is either opened or closed.

Figure 12:
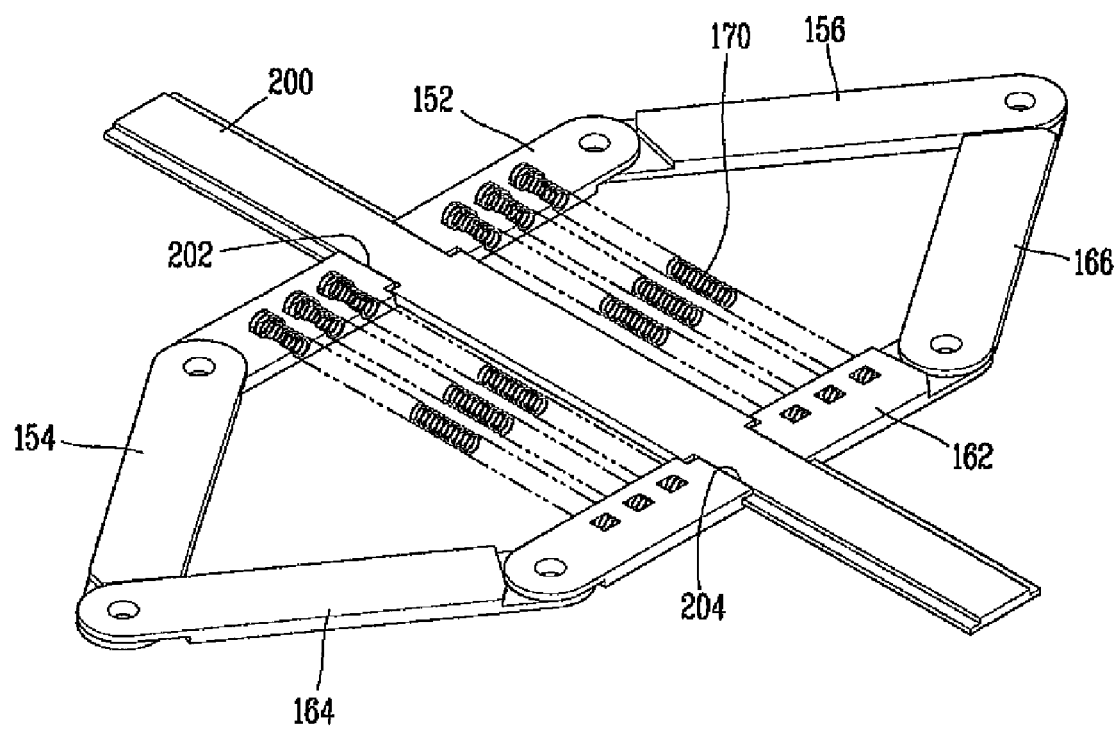
FIG. 12 is a plan view of a biasing unit in accordance with a fourth embodiment of the present invention.

A configuration of the slide module in accordance with the fourth embodiment, as seen in FIG. 12, may be the same as that of the biasing unit described in the third embodiment except that a leveling member 200 is located to maintain a horizontal/parallel state between the first link 152 and the fourth link 162.

The leveling member 200 may be provided with one end slidably inserted into a guide groove 202 formed in a width direction of the first link 152 and the other end of the leveling member 200 may be slidably inserted into a guide groove 204 formed in the width direction of the fourth link 162. Therefore, the leveling member 200 being slidably installed in a direction perpendicular to the first link 152 and the fourth link 162 can maintain the first link 152 and fourth link 162 in a horizontal/parallel state when the distance between the first link 152 and the fourth link 162 becomes narrow or wide.

Because slide module in accordance with the present invention may be provided with the biasing unit located between the first slide member and the second slide member, the interference between the slide members and the biasing unit may be minimized to attenuate noise and enhance reliability. Furthermore, the structure is simplified to reduce fabrication costs.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. For example, while the present invention has been described as using coil springs, it is understood that other mechanisms such as bands, can be used to provide an elastic force. In addition, while the elastic member(s) have been shown as extending between links directly opposite each other, it is understood that elastic member(s) could be provided as extending between different links on the first and second linkages. Furthermore, the biasing unit can be configured to provide an attractive force such as a magnetic force to assist in moving the first slide member with respect to the second slide member.

As the present inventive features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed:

1. A slide module comprising:
    a first slide member;
    a second slide member moveable with respect to the first slide member; and
    a biasing unit connecting the first slide member to the second slide member, the biasing unit including:
        a first linkage having a plurality of links, the first linkage having one end rotatably connected to the first slide member and the other end rotatably connected to the second slide member;
        a second linkage having a plurality of links, the second linkage having one end of the second linkage rotatably connected to the first slide member and the other end rotatably connected to the second slide member; and
        a biasing mechanism connected between the first linkage and the second linkage.

2. The slide module of claim 1, wherein the first linkage includes a first link rotatably connected to the first slide member and a second link rotatably connected to the second slide member, the first link is connected to the second link, and the first and second links have curved portions that extend at a predetermined angle.

3. The slide module of claim 2, wherein the second linkage includes a third link arranged to face the first link and a fourth link arranged to face the second link.

4. The slide module of claim 3, wherein overlapping connection portions are provided at each end of each link to provide the rotatable connection, each connection portion is thinner than a middle portion of each link, and a connection pin is inserted into each overlapping connection portion.

5. The slide module of claim 4, wherein a stopper portion is provided at the end of the first linkage rotatably connected at the first slide member and at the end of the second linkage rotatably connected to the second slide member, each stopper portions is formed at a lateral surface of each of the overlapping connection portions corresponding to the end of the first linkage rotatably connected at the first slide member and the end of the second linkage rotatably connected to the second slide member.

6. The slide module of claim 3, wherein the biasing mechanism includes at least a first elastic member connected between the first link and the third link, and at least a second elastic member connected between the second link and the fourth link.

7. The slide module of claim 6, wherein the first elastic member and the second elastic member are coil springs, and an elastic member mounting portion is formed to connect the coil springs at the lateral surface of each link.

8. The slide module of claim 7, wherein each elastic member mounting portion includes:
    an insertion groove provided in the link in a width direction to receive an end portion of the coil spring inserted therein; and
    a stopping protrusion inwardly protruded at a central portion of the insertion groove, the diameter of the insertion groove at the stopping protrusion is smaller than the diameter of the end portion of the coil spring inserted therein.

9. The slide module of claim 7, wherein each end of each coil spring includes a connection ring, and each elastic member mounting portion includes a connection pin protruded at the lateral surface of the link in a thickness direction of the link to receive one of the connection rings.

10. The slide module of claim 3, further comprising:
    a first connection arm connecting the first link and the third link to the first slide member; and
    a second connection arm connecting the second link and the fourth link to the second slide member.

11. The slide module of claim 1, wherein the first linkage includes:
    a first link;
    a second link having one end rotatably connected to the first slide member and the other end rotatably connected to the first link; and
    a third link having one end rotatably connected to the second slide member and the other end rotatably connected to the first link.

12. The slide module of claim 11, wherein the second linkage includes:
    a fourth link arranged to face the first link;
    a fifth link having one end rotatably connected to the first slide member and the other end rotatably connected to the fourth link; and
    a sixth link having one end rotatably connected to the second slide member and the other end rotatably connected to the fourth link.

13. The slide module of claim 12, wherein the biasing mechanism is connected between the first link and the fourth link.

14. The slide module of claim 13, wherein the biasing mechanism includes a plurality of coil springs.

15. The slide module of claim 12, wherein a leveling member is located between the first link and the fourth link so as to maintain the first link and the fourth link parallel to each other.

16. The slide module of claim 15, wherein the first link includes a guide groove in a width direction of the first link, the fourth link includes a guide groove in a width direction of the fourth link, and one end of the leveling member is slidably inserted into the guide groove of the first link and the other end of the leveling member is slidably inserted into the guide groove of the fourth link.

17. A portable terminal comprising:
    a first body;
    a second body slidably connected to the first body; and
    a slide module located between the first body and the second body, the slide module including:
        a first slide member connected to one of the first body and the second body;
        a second slide member connected to the other of the first body and the second body, the second slide member being moveable with respect to the first slide member; and
        a biasing unit connecting the first slide member to the second slide member, the biasing unit including:
            a first linkage having a plurality of links, the first linkage having one end rotatably connected to the first slide member and the other end rotatably connected to the second slide member;

a second linkage having a plurality of links, the second linkage having one end of the second linkage rotatably connected to the first slide member and the other end rotatably connected to the second slide member; and a biasing mechanism connected between the first linkage and the second linkage.

18. The portable terminal of claim 17, wherein the first linkage includes a first link rotatably connected to the first slide member and a second link rotatably connected to the second slide member, the first link is connected to the second link, and the first and second links have curved portions that extend at a predetermined angle.

19. The portable terminal of claim 18, wherein the second linkage includes a third link arranged to face the first link and a fourth link arranged to face the second link.

20. The portable terminal of claim 19, wherein the biasing mechanism includes at least a first elastic member connected between the first link and the third link, and at least a second elastic member connected between the second link and the fourth link.

21. The portable terminal of claim 20, wherein the first elastic member and the second elastic member are coil springs, and an elastic member mounting portion is formed to connect the coil springs at the lateral surface of each link.

22. The portable terminal of claim 21, wherein each elastic member mounting portion includes:

an insertion groove provided in the link in a width direction to receive an end portion of the coil spring inserted therein; and a stopping protrusion inwardly protruded at a central portion of the insertion groove, the diameter of the insertion groove at the stopping protrusion is smaller than the diameter of the end portion of the coil spring inserted therein.

23. The portable terminal of claim 17, wherein the first linkage includes:

a first link;

a second link having one end rotatably connected to the first slide member and the other end rotatably connected to the first link; and a third link having one end rotatably connected to the second slide member and the other end rotatably connected to the first link; and wherein the second linkage includes:

a fourth link arranged to face the first link;

a fifth link having one end rotatably connected to the first slide member and the other end rotatably connected to the fourth link; and a sixth link having one end rotatably connected to the second slide member and the other end rotatably connected to the fourth link.

24. The portable terminal of claim 23, wherein the biasing mechanism is connected between the first link and the fourth link.

25. The portable terminal of claim 23, wherein a leveling member is located between the first link and the fourth link so as to maintain the first link and the fourth link parallel to each other.

26. A portable terminal comprising:

a first body;

a second body slidably connected to the first body; and a slide module located between the first body and the second body, the slide module including:

a first slide member;

a second slide member moveable with respect to the first slide member; and a biasing unit coupled between the first and second slide members, the biasing unit including:

a first linkage having a plurality of links, one end being coupled with the first slide member, and the other end being coupled with the second slide member;

a second linkage having a plurality of links, a portion of the second linkage being parallel to a portion of the first linkage, one end of the second linkage being coupled with the first slide member, and the other end being coupled with the second slide member; and a plurality of coil springs generating a biasing force between the first linkage and the second linkage, each coil spring having one end connected to the portion of the first linkage and the other end connected to the portion of second linkage.

27. The portable terminal of claim 26, wherein the first linkage includes a first link rotatably connected to the first slide member and a second link rotatably connected to the second slide member, the first link is connected to the second link, and the first and second links each having a curved portion that extends at a predetermined angle.

* * * * *